3,595,612
PROCESS FOR PREPARING CHLORINE-FREE NITRIC ACID SOLUTIONS
Alfred Schmidt, Wolfgang Gauster, and Ferdinand Weinrotter, Linz (Danube), Walter Müller, Leonding, near Linz, and Günther Raab, Steyr, Austria, assignors to Osterreichische Stickstoffwerke AG, Linz, Austria
No Drawing. Filed Apr. 1, 1968, Ser. No. 717,964
Claims priority, application Austria, June 15, 1967, A 5,556/67
Int. Cl. C01b *21/46*
U.S. Cl. 23—157A                                                6 Claims

ABSTRACT OF THE DISCLOSURE

Removal of practically all the chlorine content from nitric acid solutions by adding a small quantity of dinitrogen tetroxide after the bulk of the nitrosyl chloride has been driven off. Thus, severe corrosion problems are avoided.

---

The present invention relates to an improved process for preparing chlorine-free nitric acid solutions.

On reacting acid chloride solutions with dinitrogen tetroxide or nitric acid, nitrate solutions and/or nitric acid and nitrosyl chloride are jointly produced, with a certain amount of nitrosyl chloride remaining dissolved in the resulting reaction mixture. Whilst the nitrite ions produced from the nitrosyl chloride by hydrolysis only lead to difficulties when manufacturing mixed fertilisers, since on neutralisation with ammonia ammonium nitrite is produced and the latter decomposes to nitrogen and water on subsequent drying and thereby causes a significant loss of nitrogen, the chlorine ion content causes much greater difficulties on any further use of the nitric acid or of the nitrate solution, for reasons of corrosion. Since only titanium exhibits a satisfactory resistance to nitric acid containing chloride but the price of this material and of the manufacturing costs is too high, there is no choice but to remove the chlorine ions completely from the nitrate solutions or the nitric acid.

It has been found that on blowing the gaseous nitrosyl chloride out of the solution by means of a inert gas the nitrite ion content can be practically completely removed, but that the chlorine ion cannot be entirely removed from the solution by this means. Whatever way is used for the blowing-out, a residual content of up to 0.4% of chlorine ions remains in the solution which cannot be removed however long blowing is continued.

It has now surprisingly been found that the residual content of chlorine ions can be removed if after removing the bulk of the nitrosyl chloride a small quantity of dinitrogen tetroxide is added.

Accordingly the present invention provides, a process for treating a nitric acid solution containing nitrosyl chloride and optionally containing solid so as to obtain nitric acid free of chlorine ions, which comprises passing an inert gas through the solution to blow out the bulk of the nitrosyl chloride in the gaseous phase, adding dinitrogen tetroxide in an amount representing an excess relative to the residual chlorine ion content, and then completing the blowing-out process.

The process according to the invention is carried out by adding to the solution, after removal of the bulk of the nitrosyl chloride, a preferred quantity of dinitrogen tetroxide which is 0.4 to 0.7 times the amount of nitrosyl chloride present in the nitric acid used as the starting material. In this way it proves possible to reduce the chlorine ion content to 0.05%.

The blowing-out of the nitric acid containing nitrosyl chloride preferably takes place in counter-current and may be carried out in equipment which is usual for such operations, for example in a plate column. The procedure followed is to introduce the starting material at the head of the column, to introduce the stream of inert gas at the lowest plate and to introduce the dinitrogen tetroxide approximately at the centre of the blowing-out column.

The blowing-out step is improved if it is carried out with simultaneous increase in temperature, and it is appropriately carried out at a temperature of from 20° to 50° C. Working at a pressure of 0.1 to 1 atmosphere absolute proves equally advantageous. Oxygen, air or nitrogen may be used as the inert gas.

If the blown-out nitrosyl chloride is subsequently to be worked up by oxidation, then it is appropriate to blow out with the amount of oxygen or air required for the oxidation of the nitrosyl chloride and to pass the gas mixture containing nitrosyl chloride, which has been driven off in this way, directly to the oxidation stage.

The following examples are given to illustrate the process of the present invention in more detail.

EXAMPLE 1

256 parts by weight of 45% nitric acid, containing 3.05% by weight of chlorine ions and 2.58% by weight of nitrosyl ions, corresponding to 5.63% by weight of nitrosyl chloride, are blown out with nitrogen, in a reaction vessel, at a temperature of 25° C. and a pressure of 1 atmosphere absolute. After passing 25 parts by weight of nitrogen through the solution, the solution contains 0.29% of chlorine ions. 3.9 parts by weight of liquid dinitrogen tetroxide are now added and a further 25 parts by weight of nitrogen are passed through. After completion of the blowing-out process the solution contains 0.0% of nitrosyl ions and only 0.05% of chlorine ions.

EXAMPLE 2

41.54 kg./hr. of a slurry consisting of 13.8 kg. of potassium nitrate, 26.9 kg. of nitric acid (saturated with potassium nitrate at 35° C.) and 0.84 kg. of dissolved nitrosyl chloride are introduced at the head of a plate column having 8 perforated plates each of 500 mm. height and 100 mm. diameter.

1000 l./hr. of oxygen is simultaneously introduced at the bottom of the blowing-out column and the nitrosyl chloride is blown out of the slurry at a temperature of 35° C. and a pressure of 1 atmosphere absolute.

0.35 l./hr. of liquid dinitrogen tetroxide is added dropwise at the 4th plate of the column through a short tube fixed to the side. 0.82 kg./hr. of nitrosyl chloride, 1.43 kg./hr. of oxygen and 0.52 kg./hr. of dinitrogen tetroxide escape at the head of the column. A mixture of 13.8 kg./hr. of potassium nitrate, and 26.9 kg./hr. of nitric acid, which however contains no $NO^+$ and only 0.05% of $Cl^-$, is withdrawn from the sump of the blowing-out column.

In order to manufacture the slurry employed, 15 kg./hr. of potassium chloride and 15 l./hr. of 60% strength nitric acid are reacted in a cascade reactor, consisting of three 10 litre containers, with liquid nitrogen in such a way that 10 l./hr. of dinitrogen tetroxide are added in the first container, and 2.5 l./hr. of dinitrogen tetroxide are added in the second container. The temperature is $+10°$ C. in the first and second containers whilst in the third container the temperature is raised to $+35°$ C.

EXAMPLE 3

0.57 kg./hr. of a mixture consisting of 7.80% of nitrosyl chloride, 0.37% of nitrogen dioxide as well as 36.5% of nitric acid and 55.33% of water are introduced at the head of a glass column, having 10 perforated plates each 40 mm. high and of 55 mm. diameter, at a temperature of 20° C. and a pressure of 1 atmosphere absolute, and are blown out with 500 l./hr. of nitrogen. 0.015 l./hr. of liquid dinitrogen tetroxide are introduced below the 6th plate of the column. A gas mixture containing 0.0445 kg./hr. of nitrosyl chloride, 0.625 kg./hr. of nitrogen and 0.0245 kg./hr. of dinitrogen tetroxide escapes at the head of the column. 0.524 kg./hr. of a mixture consisting of 40.0% of nitric acid and 60.0% of water, and which is free of chlorine ions, are withdrawn from the sump of the blowing-out column.

The mixture to be employed is manufactured in a stirred container equipped with a stirrer, thermometer, introduction device and gas outlet tube, with 300 parts by weight of 21% strength hydrochloric acid being initially introduced and 130 parts by volume of liquid dinitrogen tetroxide being added dropwise at 10° C.

What is claimed is:

1. In a process for working up a nitric acid solution containing nitrosyl chloride, so as to obtain nitric acid free of chlorine ions by blowing out the gaseous nitrosyl chloride by means of an inert gas, the improvement which comprises adding dinitrogen tetroxide in an amount representing an excess relative to the residual chlorine content, after removal of the bulk of the nitrosyl chloride by the blowing-out process, and then completing the blowing-out process.

2. A process according to claim 1, in which the amount of dinitrogen tetroxide amounts to 0.4 to 0.7 times the amount of nitrosyl chloride contained in the nitric acid solution used as the starting material.

3. A process according to claim 1, in which the blowing-out is carried out in a column into which the nitric acid solution containing nitrosyl chloride is introduced at the head, the stream of inert gas is introduced at the bottom, and the dinitrogen tetroxide is introduced approximately in the middle of the column.

4. A process according to claim 1, in which the inert gas is oxygen, nitrogen or air.

5. A process according to claim 1, in which the blowing-out is carried out at a temperature of from 20° to 50° C.

6. A process according to claim 1, in which the blowing-out is carried out at a pressure of 0.1 to 1 atmosphere absolute.

References Cited
UNITED STATES PATENTS

| | | | |
|---|---|---|---|
| 3,075,825 | 1/1963 | Savolainen | 23—157X |
| 2,185,579 | 1/1940 | Beekhuis | 23—157 |
| 2,919,972 | 1/1960 | Hyman et al. | 23—102X |
| 3,214,240 | 10/1965 | Beekhuis | 23—203 |
| 3,290,115 | 12/1966 | Smai et al. | 23—157 |

OSCAR R. VERTIZ, Primary Examiner

G. O. PETERS, Assistant Examiner

U.S. Cl. X.R.

23—219